United States Patent
Bretl et al.

(10) Patent No.: US 6,360,219 B1
(45) Date of Patent: Mar. 19, 2002

(54) OBJECT QUEUES WITH CONCURRENT UPDATING

(75) Inventors: Robert F. Bretl; Martin R. McClure, both of Portland, OR (US)

(73) Assignee: Gemstone Systems, Inc., Beaverton, OR (US)

( * ) Notice: Subject to any disclaimer, the term of this patent is extended or adjusted under 35 U.S.C. 154(b) by 0 days.

(21) Appl. No.: 09/212,969

(22) Filed: Dec. 16, 1998

(51) Int. Cl.[7] ............................................... G06F 17/30
(52) U.S. Cl. .............................. 707/8; 707/100; 710/52; 711/133; 711/159
(58) Field of Search .................. 707/1–202; 710/52–57; 711/133–146, 159, 160, 165–168

(56) References Cited

U.S. PATENT DOCUMENTS

| | | | | |
|---|---|---|---|---|
| 5,689,693 A | * | 11/1997 | White | 395/565 |
| 5,996,067 A | * | 11/1999 | White | 712/224 |
| 6,145,061 A | * | 11/2000 | Garcia et al. | 711/154 |

OTHER PUBLICATIONS

Herlihy, M. "Apologizing versus Asking Permission: Optimistic Concurrency Control for Abstract Data Types", ACM Transactions on Database Systems, 15(1), Mar. 1990.

Schwarz, P., and A. Spector. "Synchronizing Shared Absract Types", ACM Transactions on Computing Systems 13(1), Aug. 1984.

Weihl, W.E. "Local Atomicity Properties: Modular Concurrency Control For Abstract Data Types," ACM Transactions on Programming Languages and Systems, 11(2), Apr. 1992.

Almarode, J. and Bertl, R. "Reduced Conflict Objects", Journal Of Object Oriented Programming pp. 40 Jan. 1998.

D. Knuth, The Art of Computer Programming, Addison–Wesley Publ. Co., Reading, Mass., 234–238, 1997.

* cited by examiner

Primary Examiner—Maria N. Von Buhr
(74) Attorney, Agent, or Firm—ipsolon llp (57) ABSTRACT

A queue data structure is stored on a computer-readable medium to represent a queue or list. The data structure includes a head pointer that points to the last or most recent list element to have been removed from the queue, and a tail pointer that points to the most recently added list element in the queue. The head pointer and tail pointer may be implemented as separate objects. The queue data structure is applicable to computer arts such as transactional database management. The queue data structure can prevent concurrency conflicts that could otherwise occur when an object modified in one transaction (e.g. by one user) is modified by another concurrent transaction (e.g. by another user).

31 Claims, 9 Drawing Sheets

OBJECT QUEUES WITH CONCURRENT UPDATING

FIELD OF THE INVENTION

The present invention relates to concurrency control management for data structures in multi-user systems and, in particular, to concurrency control management for object queues.

BACKGROUND AND SUMMARY OF THE INVENTION

In database systems, a transaction is a mechanism that allows multiple users to atomically perform in isolation database modifications that are guaranteed to be consistent and resilient when committed. With reference to database information in the form of software objects, for example, a write/write conflict occurs when an object modified in one transaction (e.g., by one user) is modified by another concurrent transaction (e.g., by another user). For example, when a transaction (e.g., by a first user) writes an object and executes complex behavior based upon the state of that object, the transaction cannot commit successfully if in the meantime another transaction (e.g., by a second user) has committed a modification of that object.

To prevent such concurrency conflicts, a database system implementer can either lock objects to prevent more than one user at a time from accessing the object or write complex application code to avoid the conflicts. A transaction can lock the objects being modified by the transaction to prevent conflicts with other transactions. However, locking can be expensive because it requires arbitration by a lock manager and deadlock detection. Locking objects also enforces an ordering of transactions such that the database remains in a consistent state, but this comes at the cost of decreased availability of the locked objects. When a transaction locks an object, other transactions are restricted from accessing the object until the transaction releases its lock on the object. Consequently, an implementor must typically balance the cost of pessimistic concurrency control (using locks) with the probability of conflict under optimistic (non-locking) concurrency control.

Transactional database systems can operate on a wide variety of data structures. Queues are a type of data structure that is sometimes used in database systems to model real world applications or environments having serial or sequential characteristics. A queue is a linear list for which all insertions are made at one end of the list and all deletions are made at the other. Queues are sometimes referred to as first-in-first-out (FIFO) lists. An example of an application or environment with serial or sequential characteristics is a manufacturing facility or factory in which products undergo successive manufacturing operations (e.g., the products move or flow from one work station to another or undergo one process after another).

In this type of application, typically one or more users, referred to as producers, add objects to a database queue and another user, referred to as a consumer, deletes objects from the queue. The producers are production units or processes that precede the consumer production unit or process. An addition to the queue represents addition of a product to the queue of objects to be acted upon by the consumer production unit or process. A deletion from the queue represents deletion of a product from the queue of objects to be acted upon by the consumer production unit or process. Deletion occurs, for example, when the consumer production unit or process receives the next product item on which to perform an operation. When it finishes its operation, the consumer production unit or process then adds the product to the queue of a subsequent production unit or process and passes the product to the subsequent unit or process. The subsequent production unit or process then becomes the consumer and the former consumer becomes the producer.

In accordance with the present invention, a queue data structure is stored on a computer-readable medium to represent a queue or list. The data structure includes a head pointer that points to the most recent list element to have been removed from the queue, and a tail pointer that points to the most recently added element in the queue. The head pointer and tail pointer are implemented as separate objects to avoid write/write conflicts.

A characteristic of this queue data structure is that neither the head pointer nor the tail pointer is NULL when the queue is empty. Adding an element to the queue modifies two objects: the tail pointer and the element previously referenced by the tail pointer. Removing an element from the queue modifies the head pointer, but not the tail pointer. As a result, adding and removal operations involve updates of non-intersecting sets of objects. This allows one user to add an element and another user to remove an element concurrently, without incurring a transaction conflict that can arise in prior art queue data structures without data locks or synchronization mechanisms. This is achieved by changing the definition of the data structure and the operations on it so that an operation that adds an element to the queue does not write the same object as an operation that removes an element from the queue.

The primary case of having concurrent modifications of the same object occurs when the queue is empty. Transaction conflicts are avoided by preventing the head pointer and the tail pointer from being NULL when the queue is empty or, conversely, by maintaining the most recently removed element in the queue even when it is empty. In one implementation, the present invention solves the problem of how to efficiently implement a queue in a transaction environment in which one user adds items to a queue (the producer) while another user concurrently removes or deletes items from the queue (the consumer) without using locking or other serialization mechanisms. The present invention may also be applied to shared memory architectures, as well as to other database systems that model queue behavior, such as relational databases.

Additional advantages of the present invention will be apparent from the detailed description of the preferred embodiment thereof, which proceeds with reference to the accompanying drawings.

DETAILED DESCRIPTION OF PREFERRED EMBODIMENTS

Figure 1:
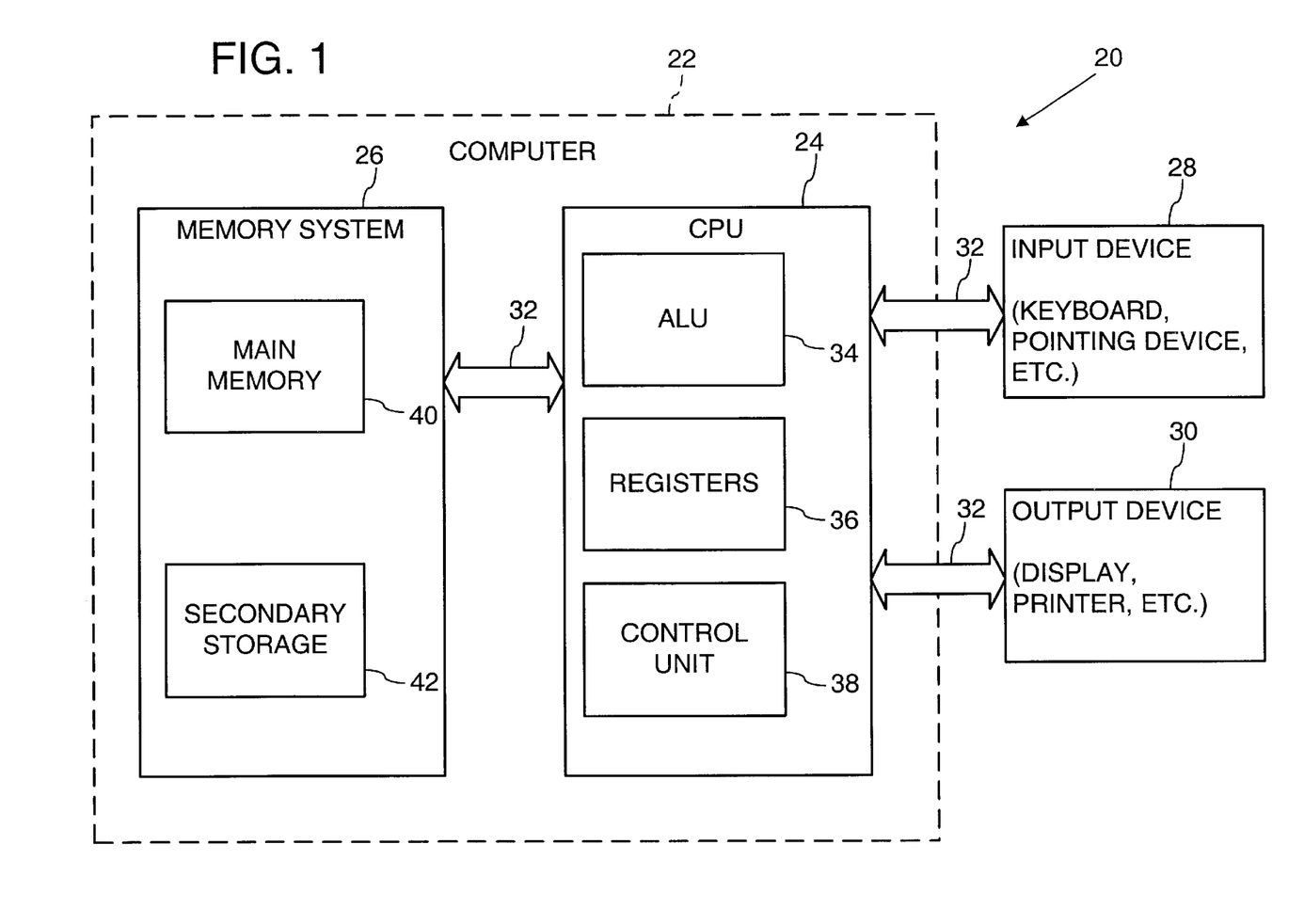
FIG. 1 is a block diagram of a computer system that may be used to implement the present invention.

FIG. 1 illustrates an operating environment for an embodiment of the present invention as a computer system 20 with a computer 22 that comprises at least one high speed processing unit (CPU) 24 in conjunction with a memory system 26, an input device 28, and an output device 30. These elements are interconnected by at least one bus structure 32.

The illustrated CPU 24 is of familiar design and includes an ALU 34 for performing computations, a collection of registers 36 for temporary storage of data and instructions, and a control unit 38 for controlling operation of the system 20. The CPU 24 may be a processor having any of a variety of architectures including Alpha from Digital, MIPS from MIPS Technology, NEC, IDT, Siemens, and others, x86 from Intel and others, including Cyrix, AMD, and Nexgen, the PowerPC from IBM and Motorola, and the Sparc architecture from Sun Microsystems.

The memory system 26 generally includes high-speed main memory 40 in the form of a medium such as random access memory (RAM) and read only memory (ROM) semiconductor devices, and secondary storage 42 in the form of long term storage mediums such as floppy disks, hard disks, tape, CD-ROM, flash memory, etc. and other devices that store data using electrical, magnetic, optical or other recording media. The main memory 40 also can include video display memory for displaying images through a display device. Those skilled in the art will recognize that the memory 26 can comprise a variety of alternative components having a variety of storage capacities.

The input and output devices 28 and 30 also are familiar. The input device 28 can comprise a keyboard, a mouse, a physical transducer (e.g., a microphone), etc. The output device 30 can comprise a display, a printer, a transducer (e.g., a speaker), etc. Some devices, such as a network interface or a modem, can be used as input and/or output devices.

As is familiar to those skilled in the art, the computer system further includes an operating system and at least one application program. The operating system is the set of software which controls the computer system's operation and the allocation of resources. The application program is the set of software that performs a task desired by the user, using computer resources made available through the operating system. Both are resident in the illustrated memory system 26.

In accordance with the practices of persons skilled in the art of computer programming, the present invention is described below with reference to acts and symbolic representations of operations that are performed by computer system 20, unless indicated otherwise. Such acts and operations are sometimes referred to as being computer-executed and may be associated with the operating system or the application program as appropriate. It will be appreciated that the acts and symbolically represented operations include the manipulation by the CPU 24 of electrical signals representing data bits which causes a resulting transformation or reduction of the electrical signal representation, and the maintenance of data bits at memory locations in memory system 26 to thereby reconfigure or otherwise alter the computer system's operation, as well as other processing of signals. The memory locations where data bits are maintained are physical locations that have particular electrical, magnetic, or optical properties corresponding to the data bits.

Figure 2:
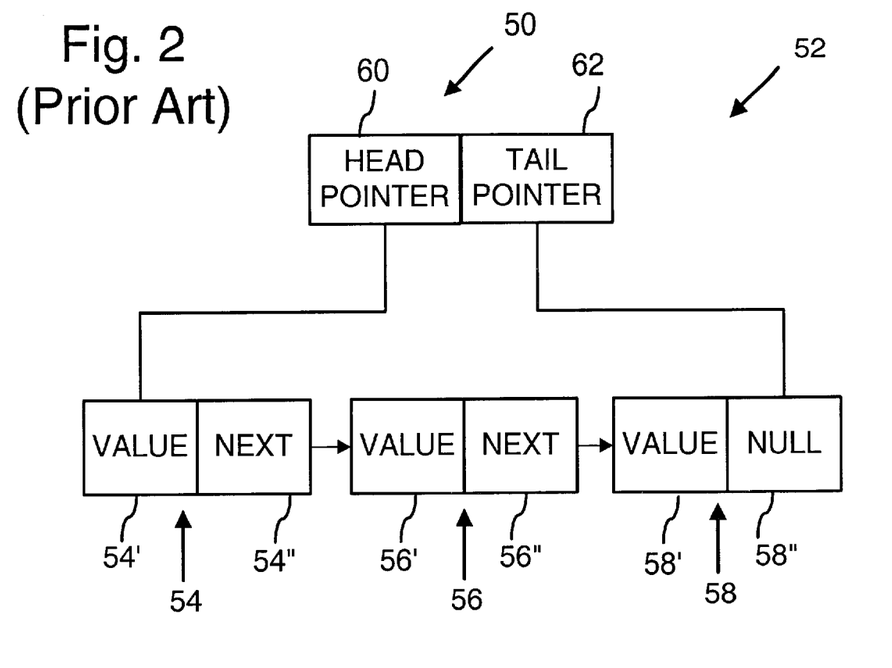
FIG. 2 is a block diagram representing a prior art simplified queue data structure.

FIG. 2 is a block diagram representing a prior art simplified queue data structure 50 that is included in and represents a queue or list 52 of, for example, three list elements 54, 56, and 58. A queue is a linear list for which all insertions are made at one end of the list and all deletions are made at the other. Queues are sometimes referred to as first-in-first-out (FIFO) lists.

Figure 3:
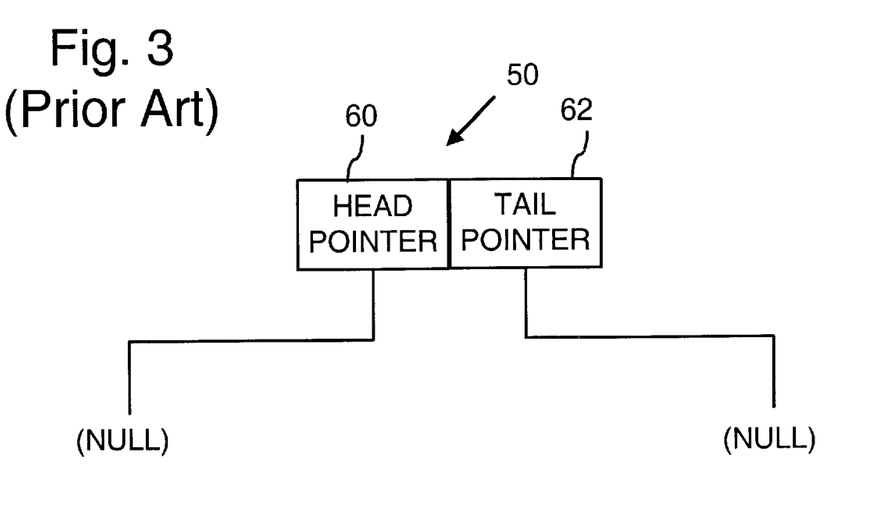
FIG. 3 is a block diagram illustrating the prior art queue data structure of FIG. 2 representing an empty or NULL queue.

Each of the list elements 54, 56, and 58 includes, respectively, a value 54', 56', and 58' and a pointer 54", 56", and 58" pointing to the next element in queue 52. With no element in queue 52 following list element 58, its pointer 58" holds a NULL value. A head pointer 60 points to the next data element (e.g., data element 54) to be removed from queue 52, and a tail pointer 62 points to the most recently added data element (e.g., data element 58) added to and in queue 52. If queue 52 is empty, head pointer 60 and tail pointer 62 are NULL, as illustrated in FIG. 3.

When a new list element (not shown) is added to queue 52, tail pointer 62 is checked to determine if it is NULL and hence whether queue 52 is empty. If tail pointer 62 is NULL (i.e., queue 52 is empty), a pointer to the new list element is stored in both head pointer 60 and tail pointer 62 and the next field in the new list element is set to NULL. If tail pointer 62 is not NULL (i.e., queue 52 is not empty), addition of the new list element involves changing the next pointer field in the element referenced by tail pointer 62 (e.g., list element 58 in FIG. 2) to point to the new element and setting tail pointer 62 to reference the new element. Removing an element from queue 52 entails following head pointer 60 to the next element (e.g., list element 54) and setting head pointer 60 to point to the next element in the queue (e.g., list element 56). If a NULL value is set at head pointer 60, such as because the queue becomes empty after removal of the last element, tail pointer 62 is also updated to NULL.

Queue data structure 50 is suitable for a single process application in which only one transaction at a time (e.g., by one user at a time) is allowed to add to or remove from queue 52. Such an application is, however, somewhat simplistic in the multiple user, multiple process transactional applications in which queue data structures are now used. In these types of applications, queue data structure 50 would suffer from concurrency conflicts on both head pointer 60 and tail pointer 62 if queue 52 were empty. These concurrency conflicts would arise because both users must update both head pointer 60 and tail pointer 62 in each of their individual transactions. To avoid these conflicts, the queue data structure would typically need to be implemented in conjunction with locks, which reduce concurrency, or some complex synchronization mechanism that avoids conflicts but can be difficult or cumbersome to implement.

Figure 4:
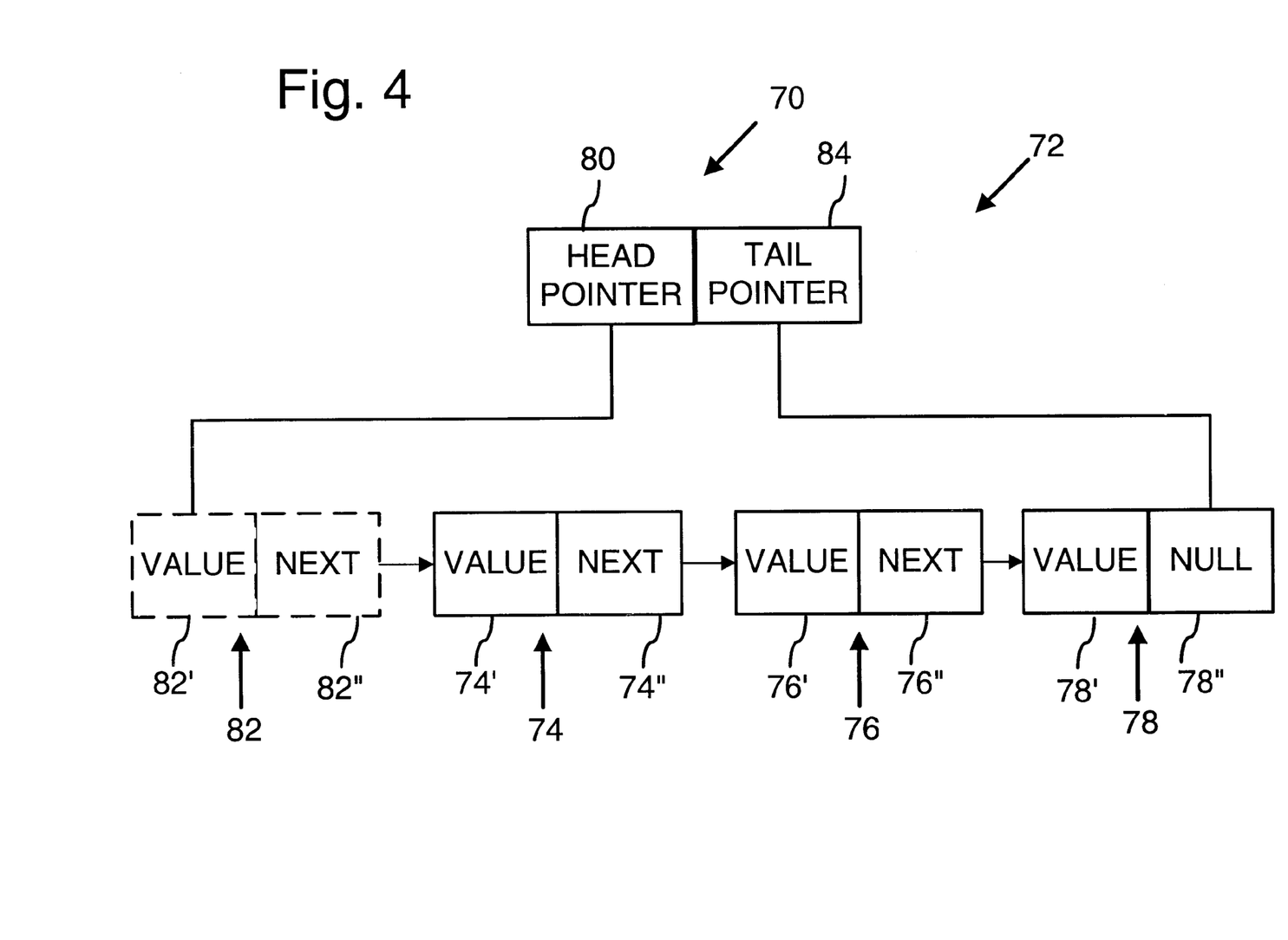
FIG. 4 is a block diagram representing a queue data structure according to the present invention stored on a computer-readable medium and representing an object queue.

FIG. 4 is a block diagram representing a queue data structure 70 according to the present invention stored on a computer-readable medium. Queue data structure 70 is included in and represents a queue or list 72 of, for example, three list elements 74, 76, and 78. Any number of list elements could be included. Only three are shown for purposes of illustration.

Each of list elements 74, 76, and 78 includes, respectively, a value 74', 76', and 78' and a pointer 74", 76", and 78" pointing to the next element in queue 72. A head pointer 80 points to the last or most recent list element 82 to have been removed from queue 72. List element 82 may also be referred to as most recently removed element 82 and is represented by a dashed box to distinguish most recently removed element 82 from elements 74–78 remaining in queue 72. A tail pointer 84 points to the most recently added list element (e.g., data element 78) in queue 72. It will be appreciated that previous to its removal, data element 82 had been included as a fourth element in queue 72.

List elements 74, 76, and 78 may be or represent data, information, or processes in any of a variety or forms. In some applications list elements 74, 76, and 78 may be simple data or information that are queued for processing. In other more sophisticated applications list elements 74, 76, and 78 may be or include software objects of the type used in object oriented programming languages or models such as Java, C++, COM, CORBA, etc. Similarly, head pointer 80 and tail pointer 84 are implemented in or as separate objects. The more sophisticated applications may include distributed client-server databases in which users share objects across time and space and concurrent transactions can read and modify the same objects that other transactions are accessing.

For example, queue 72 may be used in a database system to model real world applications or environments having serial or sequential characteristics. An example of an application or environment with serial or sequential characteristics is a manufacturing facility or factory in which products undergo successive manufacturing operations (e.g., the products move or flow from one work station to another or undergo one process after another).

In this type of application, typically one or more users, referred to as producers, add objects to the database queue and another user, referred to as a consumer, deletes objects from the queue. The producers are production units or processes that precede the consumer production unit or process. An addition to the queue represents addition of a product to the queue of objects to be acted upon by the consumer production unit or process. A deletion from the queue represents deletion of a product from the queue of objects to be acted upon by the consumer production unit or process. Deletion occurs, for example, when the consumer production unit or process receives the next product item on which to perform an operation. When it finishes its operation, the consumer production unit or process then adds the product to the queue of a subsequent production unit or process and passes the product to the subsequent unit or process. The subsequent production unit or process then becomes the consumer and the former consumer becomes the producer. A queue data structure used in an environment having a single producer and a single consumer is sometimes referred to as a "pipe."

Figure 5:
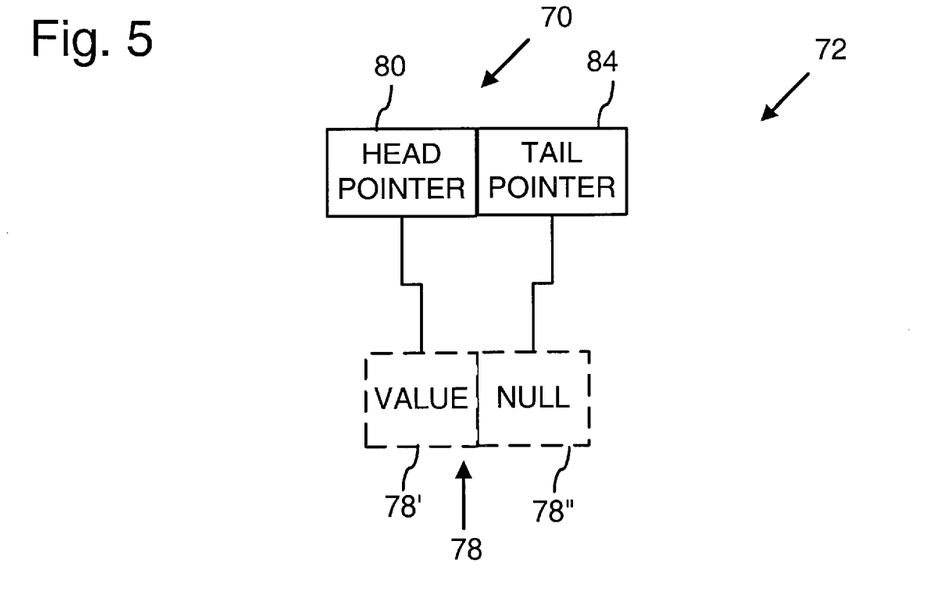
FIG. 5 is a block diagram illustrating the queue data structure of FIG. 4 representing an empty or NULL queue.

FIG. 5 is a block diagram illustrating queue data structure 70 representing an empty or NULL queue or list 72 of which list element 78 had been the last element to be removed. Head pointer 80 points to the now most recently removed element 78, and tail pointer 84 also points thereto. List element 78 in the data structure of FIG. 5 is represented by a dashed box to indicate the element as being the one most recently removed from queue 72. With no "next" element following most recently removed element 78, its pointer 78" has a NULL value.

Figure 6:
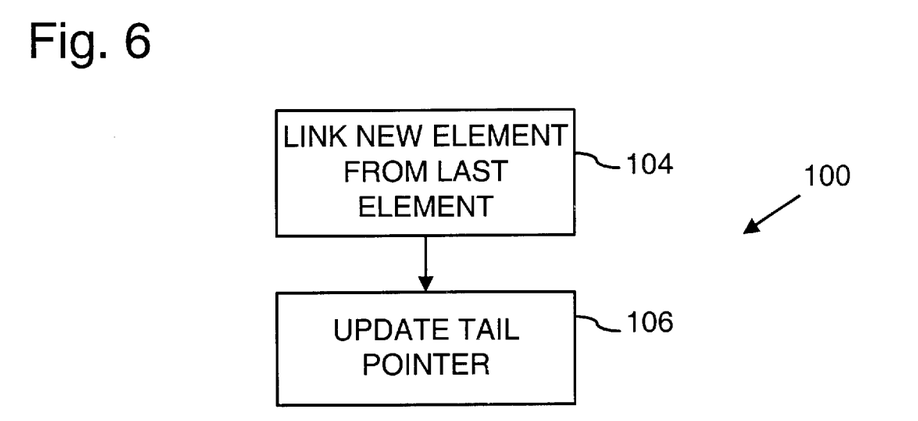
FIG. 6 is a flow diagram of a software-implemented list element adding process for adding a new list element to a queue represented by the queue data structure of FIG. 4.
Figure 7:
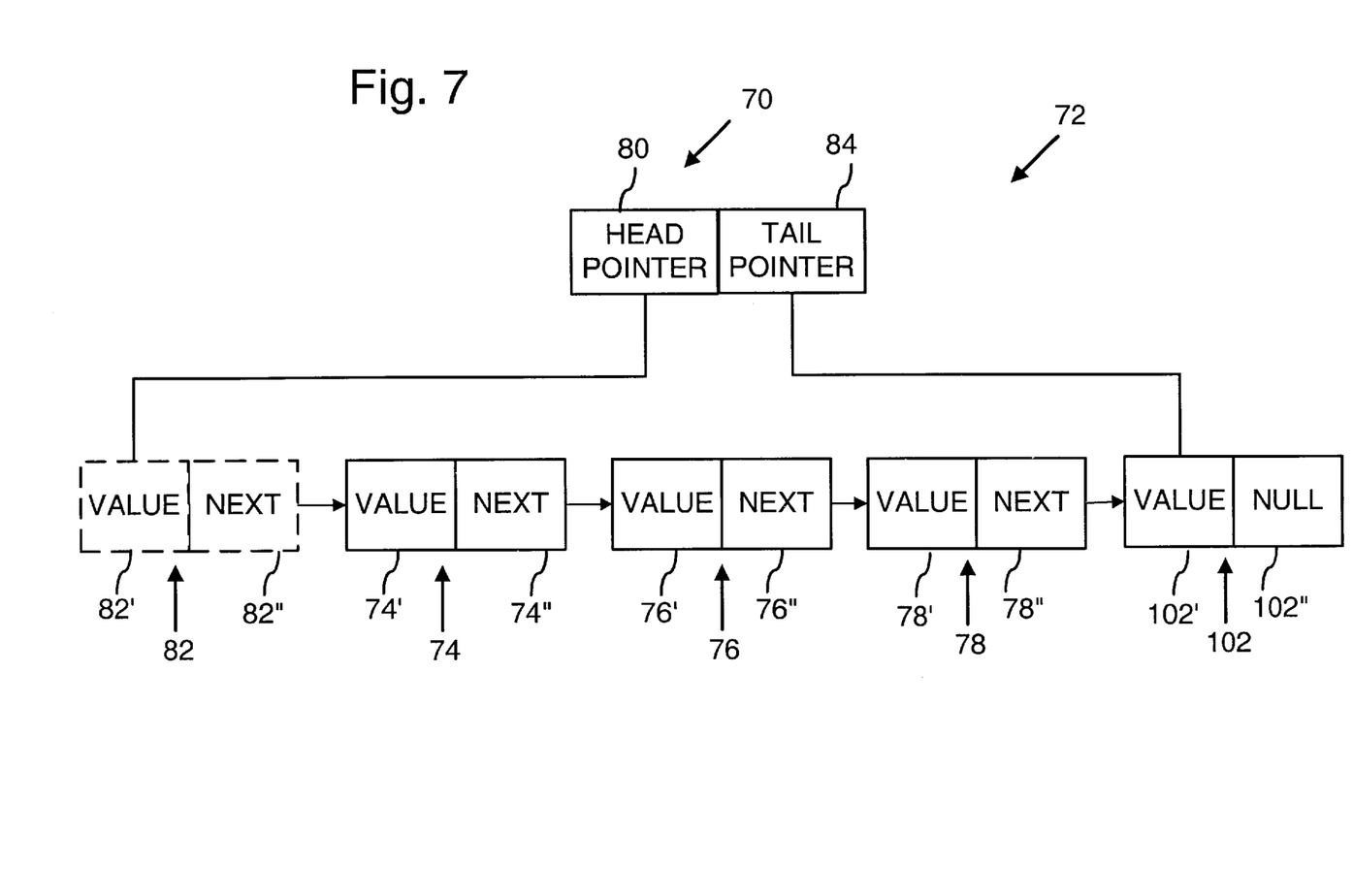
FIG. 7 is a block diagram illustrating addition of a list element by the method of FIG. 6 to a queue represented by the queue data structure of FIG. 4.

FIG. 6 is a flow diagram of a software-implemented list element adding process 100 for adding a new list element 102 (FIG. 7) to queue 72. FIG. 7 is a block diagram representing queue data structure 70 and queue 72 after implementation of adding process 100 to add list element 102. As an initial state before addition of any list elements, queue 72 includes a "dummy" element that has an empty value and a null pointer, like null state element 78 in FIG. 5.

With reference to FIGS. 4, 6 and 7, process block 104 indicates that new element 102 is linked or pointed to from the element currently referenced by tail pointer 84 (e.g., element 78 in FIG. 4). The linking to new element 102 from the element currently referenced by tail pointer 84 (e.g., element 78 in FIG. 4) entails modifying the pointer 78" to point to new element 102. This has the effect of positioning new element 102 at the end or bottom of queue 72, after element 78, as is typical in a queue or FIFO structure.

Process block 106 indicates that tail pointer 84 is updated to point to the new element 102, thereby designating element 102 with tail pointer 84 as the most recently added list element in queue 72.

Figure 8:
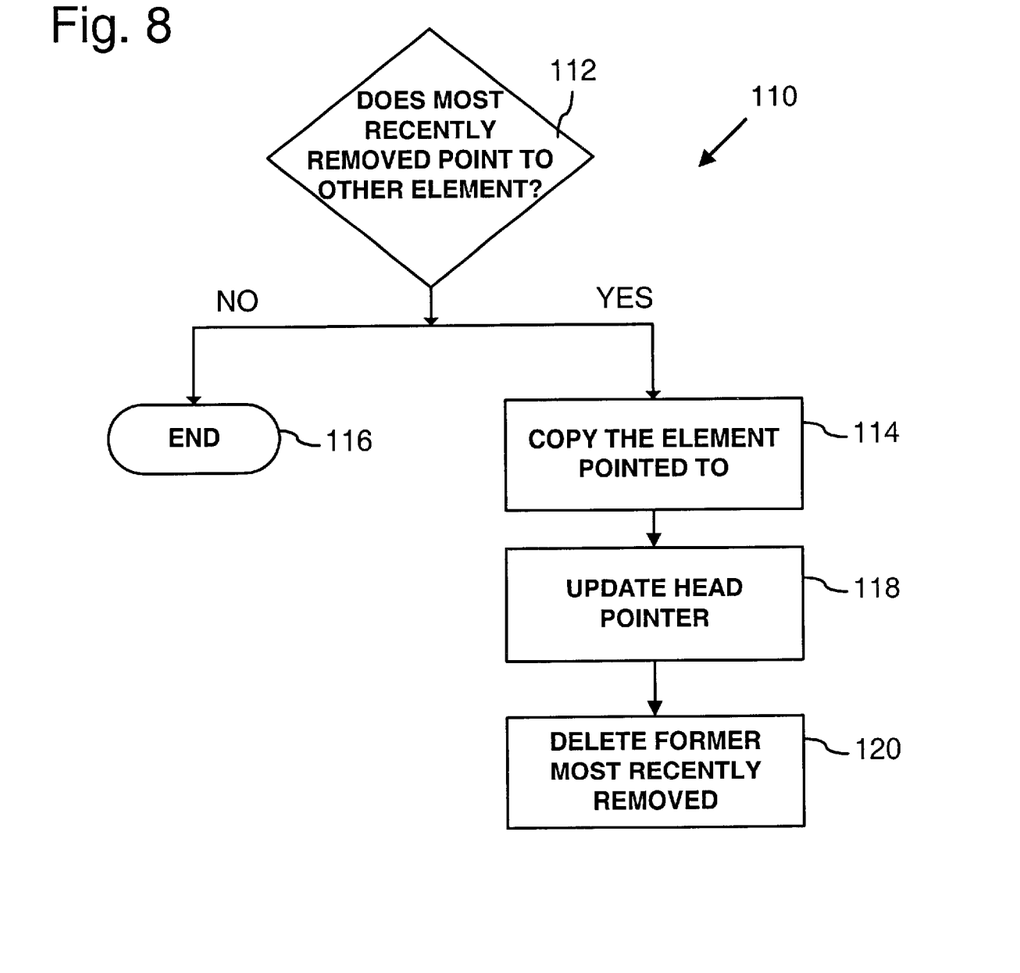
FIG. 8 is a flow diagram of a software-implemented list element removal process for removing a list element from a queue represented by the queue data structure of FIG. 4.

FIG. 8 is a flow diagram of a software-implemented list element removal process 110 for removing a list element from queue 72. Inquiry block 112 represents an inquiry as to whether the most recently removed element (e.g., element 82 in FIG. 4), which is referenced by head pointer 80, points to another element in queue 72. Inquiry block 112 proceeds to process block 114 whenever the most recently removed element (e.g., element 82 in FIG. 4) points to another element in queue 72. Inquiry block 112 proceeds to termination block 116 whenever the most recently removed element does not point to another element in queue 72.

Process block 114 indicates that a copy is obtained of the list element (e.g., element 74 in FIG. 4) to which the most recently removed element points. The copy is of the value (e.g., value 74') of the newly removed list element (e.g., element 74), which copy is passed to whatever process receives list elements from queue 72.

Figure 9:
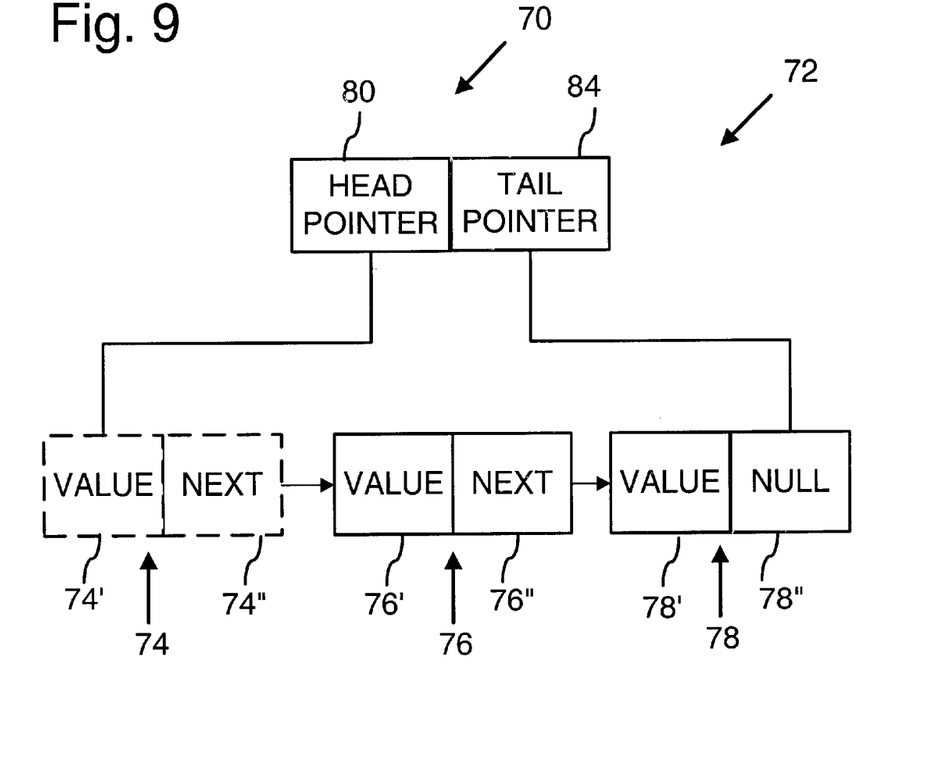
FIG. 9 is a block diagram illustrating removal of a list element by the method of FIG. 8 from a queue represented by the queue data structure of FIG. 4.

Process block 118 indicates that head pointer 80 is updated to point to the newly removed element (e.g., element 74), which becomes the most recently removed element, as shown in FIG. 9.

Process block 120 indicates that the former most recently removed element (e.g., element 82) is deleted from queue 72. It will be appreciated that this deletion may be performed as a separate explicit step or may be performed as normal background garbage collection as employed by some computer systems such as Java virtual machines. Implementing the elements as separate objects simplifies concurrency aspects of cleaning up the removed elements.

Termination block 116 terminates process 110. A most recently removed element (e.g., element 78 in FIG. 5) that does not point to another element in queue 72 (i.e., has a NULL pointer), is deemed to be in an empty queue. As such, there no element to remove and removal process 110 is terminated.

Conventional queue-based removal operations remove the first or top element in the queue. With reference to data structure 70, however, the value in the element referenced by head pointer 80 is deemed to be empty or NULL since the element has already been removed. A remove operation applied to data structure 70 removes the list element (e.g., element 74 in FIG. 4) that is pointed to by the most recently removed element (e.g., element 82 in FIG. 4).

A characteristic of data structure 70 is that neither head pointer 80 nor tail pointer 84 is NULL when queue 72 is empty. Adding an element to queue 72 modifies two objects: tail pointer 84 and the next field of element 78. Removing an element from queue 72 modifies head pointer 80, but not tail pointer 84. As a result, add process 100 and remove process 110 involve updates of non-intersecting sets of objects. This allows two users to add and to remove one or more elements simultaneously, without incurring a transaction conflict that can arise in prior art simplified queue data structure 50 without data locks or synchronization mechanisms. Data structure 70 achieves this in part by preventing head pointer 80 and tail pointer 84 from being NULL when queue 72 is empty or, conversely, by maintaining most recently removed element (e.g., element 78 in FIG. 5) in queue 72 even when it is empty, and by maintaining head and tail pointers as separate objects.

Figure 10:
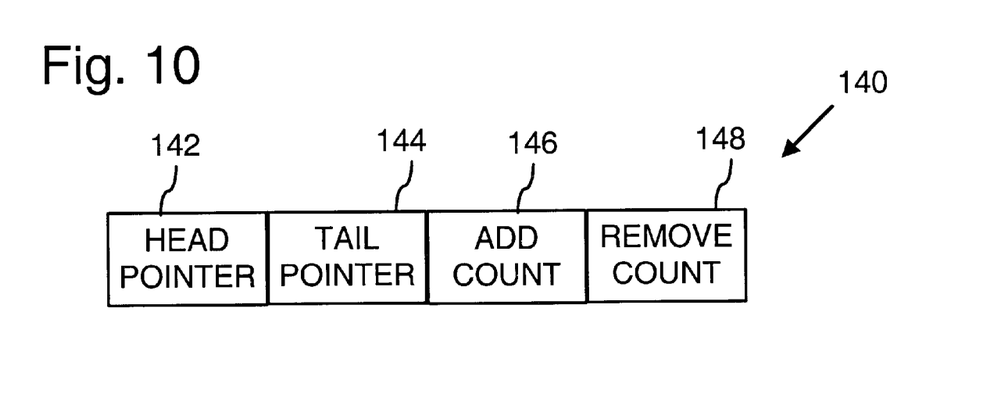
FIG. 10 is a block diagram representing an alternative queue data structure according to the present invention.

FIG. 10 is a block diagram representing an alternative queue data structure 140 according to the present invention included in and representing, for example, queue or list 72 of FIG. 4. Data structure 140 includes a head pointer 142 and a tail pointer 144 that are analogous to head pointer 80 and tail pointer 84, respectively. In addition, data structure 140 includes an add count object 146 and a removal count object 148 that cooperate to keep track of the number of list elements in queue 72.

Whenever a list element is added to the queue, such as the addition of new list element 102 to queue 72 described with reference to FIGS. 6 and 7, add count 146 is incremented. Whenever a list element is removed from the queue, such as the removal of list element 74 described with reference to FIG. 8, removal count 148 is incremented. The number of elements in the queue is the arithmetic difference between add count 146 and removal count 148: (addCount—removeCount). Removal count 148 and head pointer 142 may be implemented as separate objects or in a single or common object, but not as a single object with add count object 146 or tail pointer 144. Similarly, add count object 146 and tail pointer 144 may be implemented as separate objects or in a single or common object, but not as a single object with removal count 148 or head pointer 142.

Figure 11:
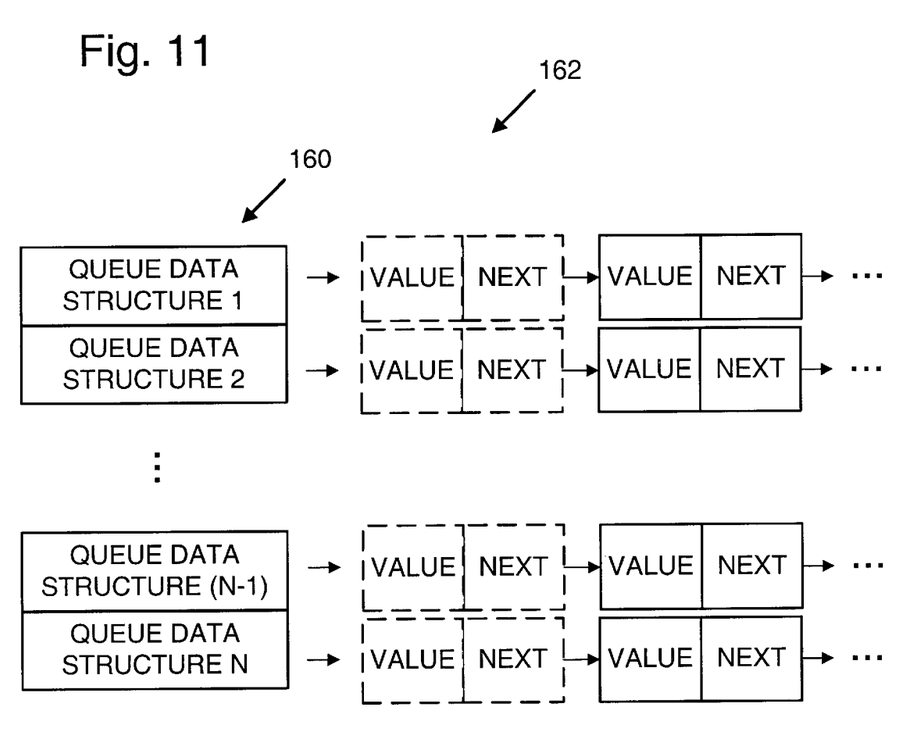
FIG.11 is a block diagram illustrating a queue data structure for a multiple producer, single consumer application.

As an example of an application utilizing add count 146 and removal count 148, a warehouse may need to keep track of the number of items in a storage bin. Some transactions add to the bin when items are received from the manufacturer and stocked on the warehouse floor. Other transactions remove items from the bin when items are ordered by a retailer and removed from the warehouse floor. An application that maintains a count of the number of items in a bin is characterized by many small decrement operations and a few large increment operations each day, and a single read (accessing the count) operation at the end of each day to determine if additional items need to be purchased. The read operation does not need to prevent concurrent modification, and is optimized in that it need not scan all of the elements in the queue to determine the number in the queue. FIG. 11 is a block diagram illustrating a multiple user queue data structure 160 representing a queue 162 for multiple users, such as multiple producers and a single consumer. In this type of application, the producers add objects to queue 162, and the consumer deletes objects from queue 162. In a database application representing a production or manufacturing facility or operation, the producers may be production units or processes that precede the consumer production unit or process.

In an example with N-number of producers, multiple user queue data structure 160 includes N-number of individual queue data structures 140, one each corresponding to each of the N-number of producers. Each of individual queue data structures 140 includes the components and features described above with reference to FIG. 10. It will be appreciated that multiple user queue data structure 160 could alternatively be implemented with N-number of individual queue data structures 70.

In operation, the consumer production unit or process receives products from N-number of producers, and these received products are represented by additions to the queues associated with the individual queue data structures 140.

When the consumer operates on a product and passes it to a subsequent consumer, the list element corresponding to that product is deleted from the corresponding queue and changes are made to the corresponding queue data structure 140, as described above. In this multiple producer, single consumer application, the queue data structures and processes of the present invention allow multiple users (i.e., the producers and consumer) to have concurrent access to database queues without concurrency conflicts.

Figure 12:
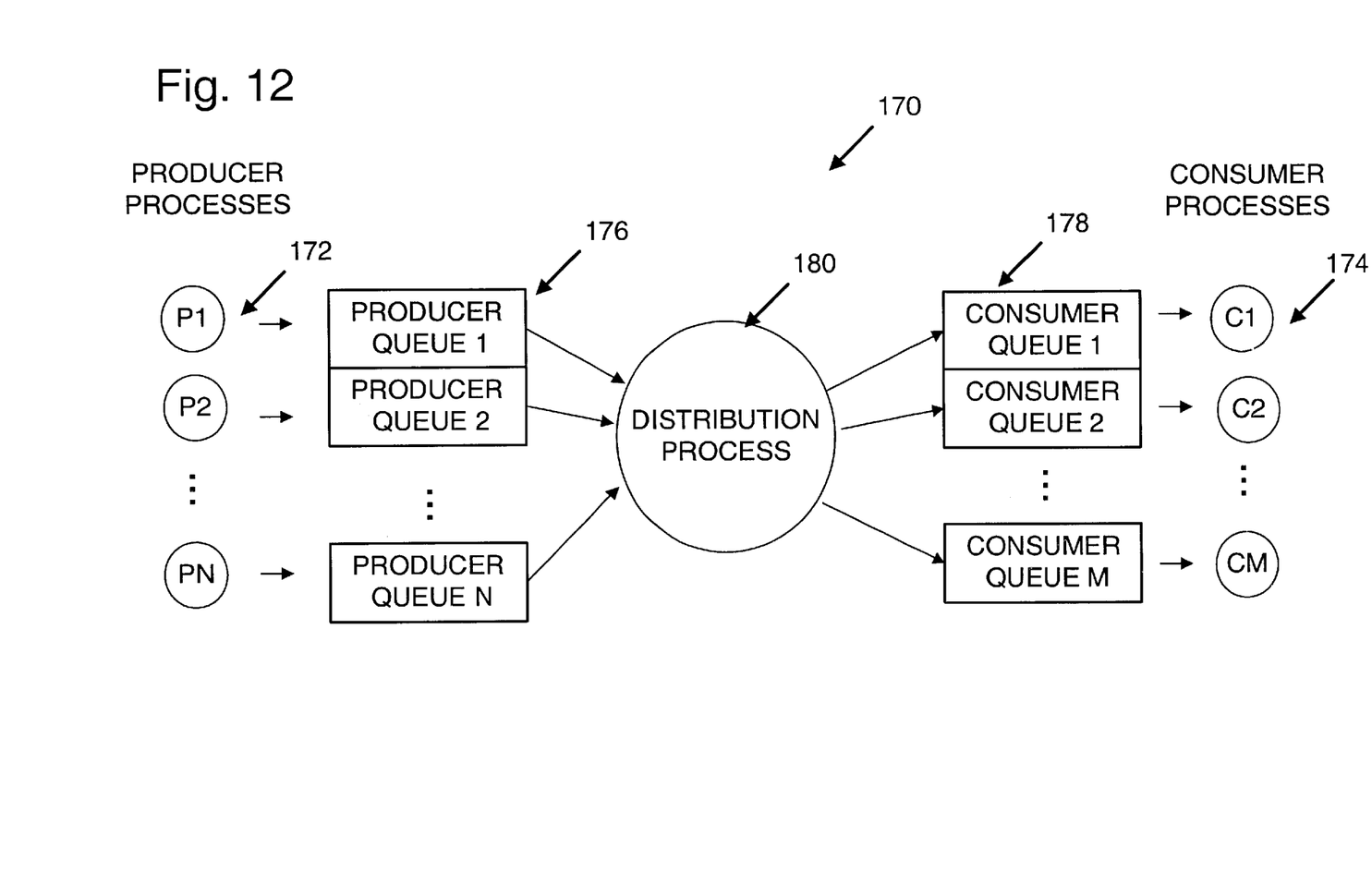
FIG. 12 is a block diagram representing a queue for a multiple producer/multiple consumer environment according to the present invention.

FIG. 12 is a block diagram illustrating a queue 170 representing elements passing between N-number of multiple producers 172 and M-number of multiple consumers 174. Each of producers 172 has associated with it a corresponding producer queue 176 that is analogous to queue 72 shown in FIGS. 4 and 7.

Elements are passed from producer queues 176 to consumer queues 178 by a distribution process 180 that distributes the elements among consumer queues 178 according to predefined criteria or standards. Each consumer queue 178 is analogous to queue 72 shown in FIGS. 4 and 7 and passes elements to its corresponding consumer 174. Each of queues 176 and 178 includes a data structure (not shown) that represents the queue and may be in the form of queue data structure 70 (FIG. 4) or queue data structure 140 (FIG. 10).

Each of producer queues 176 operates as a single producer/single consumer pipe in which distribution process 180 functions as the consumer. Similarly, each of consumer queues 178 operates as a single producer/single consumer pipe in which distribution process 180 functions as the producer. Since each of the single producer/single consumer queues avoids conflicts between the producer and consumer, this arrangement allows a multiple producer/multiple consumer queue to operate without conflict.

Database transaction mechanisms in which multiple users atomically perform database modifications in isolation can arise in a variety of environments and can be described with reference to a variety of contexts. These mechanisms are described above primarily with reference to transaction operations on a transaction space. These mechanisms are similarly applicable to database systems that model queue behavior, such as relational databases, and multiple software processes on a shared memory space or multiple threads within a process, the latter being a common feature in Java programming.

Typically, elements in a relational database are organized as tuples, which are sets (e.g., rows) of related values, one value for each database attribute (e.g., column). Tuples are commonly not implemented as software objects. Queues of tuples can be formed using conventional relational database structures and represented by queue data structures according to the present invention.

With reference to multiple software processes on a shared memory space, for example, queues are often used to pass messages between processes in the shared memory space. The queue data structures and processes of this invention can provide conflict free concurrency in such queue applications without the added processing resources or cycles required to implement conventional locks. Accordingly, it will be appreciated that the queue data structures and processes of this invention can be applied in a variety of applications and environments.

Having described and illustrated the principles of our invention with reference to an illustrated embodiment, it will be recognized that the illustrated embodiment can be modified in arrangement and detail without departing from such principles. It should be understood that the programs, processes, or methods described herein are not related or limited to any particular type of computer apparatus, unless indicated otherwise. Various types of general purpose or specialized computer apparatus may be used with or perform operations in accordance with the teachings described herein. Elements of the illustrated embodiment shown in software may be implemented in hardware and vice versa.

In view of the many possible embodiments to which the principles of our invention may be applied, it should be recognized that the detailed embodiments are illustrative only and should not be taken as limiting the scope of our invention. Rather, we claim as our invention all such embodiments as may come within the scope and spirit of the following claims and equivalents thereto.

What is claimed is:

1. In a computer readable medium having stored thereon a queue data structure representing a queue for defining a sequence of one or more list elements, the improvement comprising:

a head pointer pointing to a most recently removed list element representing a list element formerly included in the queue.

2. The data structure of claim 1 in which the head pointer is implemented in or as a software object.

3. The data structure of claim 1 further comprising a tail pointer pointing to a most recently added list element in the queue.

4. The data structure of claim 1 further comprising a tail pointer pointing to the most recently removed list element.

5. The data structure of claim 4 in which the tail pointer points to the most recently removed list element when the queue is empty.

6. The data structure of claim 4 in which the tail pointer is implemented in or as a software object.

7. The data structure of claim 6 in which the head pointer is implemented in or as a software object that is separate from the software object of the tail pointer.

8. The data structure of claim 1 further comprising an add count incrementally representing list elements added to the queue.

9. The data structure of claim 8 in which the add count and the head pointer are implemented in or as one or more software objects.

10. The data structure of claim 1 further comprising a removal count incrementally representing list elements removed from the queue.

11. The data structure of claim 10 further comprising a tail pointer pointing to the most recently removed list element, and in which the removal count and the tail pointer are implemented in or as one or more software objects.

12. The data structure of claim 1 further comprising an add count representing list elements added to the queue and a removal count representing list elements removed from the queue.

13. The data structure of claim 1 in which the one or more list elements are software objects.

14. The data structure of claim 1 in which the queue is included in a transactional database.

15. The data structure of claim 1 in which the queue is included in a relational database.

16. In a computer readable medium having stored thereon a software instructions for manipulating a queue for defining a sequence of one or more list elements and for manipulating a queue data structure having a head pointer and a tail pointer associated with the queue, the improvement comprising:

software instructions for pointing the head pointer to a most recently removed list element representing a list element formerly included in the queue.

17. The software instructions of claim 16 further including software instructions for pointing the tail pointer selectively to a most recently added list element in the queue.

18. The software instructions of claim 17 further including software instructions for pointing the tail pointer to the most recently removed list element.

19. The software instructions of claim 16 further including software instructions for adding a list element to the queue and removing a list element from the queue.

20. The software instructions of claim 19 further including software instructions for making non-intersecting sets of modifications to the head pointer and the tail pointer when adding a list element to the queue and removing a list element from the queue.

21. The software instructions of claim 16 further including software instructions for assigning the tail pointer a non-null value when the queue is empty.

22. The software instructions of claim 21 further including software instructions for pointing the tail pointer to the most recently removed list element when the queue is empty.

23. The software instructions of claim 16 further including software instructions for maintaining an add count that incrementally represents list elements added to the queue.

24. The software instructions of claim 23 further including software instructions for maintaining a removal count that incrementally represents list elements removed from the queue and for determining a difference between the add count and the removal count.

25. The software instructions of claim 16 further including software instructions for maintaining a removal count that incrementally represents list elements removed from the queue.

26. In a computer readable medium having stored thereon a queue data structure representing plural queues each for defining a corresponding sequence of one or more list elements, the improvement comprising:

plural head pointers that each point to a most recently removed list element representing a list element formerly included in one of the plural queues.

27. The data structure of claim 26 further comprising plural tail pointers that each point to a most recently added list element in one of the plural queues or the most recently removed list element in the one of the plural queues.

28. The data structure of claim 26 further comprising plural add counts that each incrementally represent list elements added to one of the plural queues.

29. The data structure of claim 26 further comprising plural removal counts that each incrementally represent list elements removed from one of the plural queues.

30. The data structure of claim 26 in which the plural queues represent plural producers for adding list elements to the queues.

31. The data structure of claim 26 in which only one consumer deletes list elements from the queues.

* * * * *